United States Patent [19]

Toki et al.

[11] Patent Number: 4,972,454

[45] Date of Patent: Nov. 20, 1990

[54] RADIO TELEPHONE APPARATUS AND A METHOD OF CONTROLLING SAME

[75] Inventors: Akio Toki; Koichi Ito, both of Tokyo; Masanori Toba, Nagano, all of Japan

[73] Assignee: Kabushiki Kaisha Toshiba, Kawasaki, Japan

[21] Appl. No.: 388,038

[22] Filed: Aug. 1, 1989

[30] Foreign Application Priority Data

Aug. 4, 1988 [JP] Japan .................. 63-194850

[51] Int. Cl.$^5$ .......................................... H04M 11/00
[52] U.S. Cl. .......................... 379/58; 379/61; 379/63; 379/263; 379/393
[58] Field of Search ............. 379/58, 61, 263, 393, 379/63

[56] References Cited

U.S. PATENT DOCUMENTS

| | | | |
|---|---|---|---|
| 4,723,265 | 2/1988 | Kamei et al. | 379/58 |
| 4,726,052 | 2/1988 | Kato et al. | 379/61 |
| 4,761,806 | 8/1988 | Toki | 379/61 |
| 4,776,001 | 10/1988 | Murata et al. | 379/63 |
| 4,802,201 | 1/1989 | Yoshizawa | 379/63 |

Primary Examiner—Joseph A. Orsino
Assistant Examiner—Kinfe-Michael Negash
Attorney, Agent, or Firm—Finnegan, Henderson, Farabow, Garrett, and Dunner

[57] ABSTRACT

A radio telephone apparatus comprising a main station connected to a wire telephone line and having a subsidiary telephone set, and a radio telephone set connected with the main station via a radio link, wherein the radio telephone set effectively or ineffectively controls a function of releasing the hold state by the off-hook operation of the subsidiary telephone set. By the operation of the radio telephone set, telephone communication can be switched between a self-hold state and a complete hold state. The self-hold state can be released only by the radio telephone set while the complete state hold can be released by any one of the radio telephone set and the subsidiary telephone set. In the complete hold state, the radio link between the main station and the radio telephone set is disconnected. If the complete hold state is released by the radio telephone set, the radio link is again established between the main station and the radio telephone set.

38 Claims, 15 Drawing Sheets

RADIO TELEPHONE APPARATUS AND A METHOD OF CONTROLLING SAME

BACKGROUND OF THE INVENTION

1. Field of the Invention

This invention relates to radio telephone apparatus which include a main station connected to a wire telephone line and a radio telephone set connected via a radio link with the main station and a method of controlling same, and more particularly to such apparatus having a function of holding telephone communication and a method of controlling same.

2. Description of the Related Art

There is a radio telephone apparatus which includes a main station connected with a wire telephone line and a radio telephone set connected via a radio link with the main station and which has a function of holding communication. The holding function is such that the user of the radio telephone set presses, for example, a holding button to hold telephone communication via the wire telephone line and to send a predetermined holding tone to the caller via the wire telephone line in order to have the caller wait for a while. The hold of the telephone communication is released by repressing the holding button or causing a subsidiary telephone set provided at the main station to go off-hook.

Assume that, for example, the user A of the radio telephone set presses the holding button to hold the telephone set in order to have the user C of a distant radio telephone set wait for a while and that the user A wants to reopen telephone communication with the user C using the radio telephone set. Under such condition, assume that another person B who does not know such situation picks up the handset of the subsidiary telephone set provided at the main station to go off-hook. This causes the hold state to be automatically release and causes the user B to abruptly talk to the user C, so that the user C would be confused while the user A would feel uncomfortable because the perfect stranger B joins the communication irrespective of the intention of the user A.

The radio link is left established between the main station and the radio telephone set under the hold condition. Thus if, for example, the user A of the radio telephone set presses the holding button to maintain the telephone set in a hold state and wants to reopen communication later via the subsidiary telephone set provided at the main station (he does not want to make telephone communication using the radio telephone set), power is consumed uselessly in order to maintain the unnecessary radio telephone line. Especially, if that the power source for the radio telephone set is a battery is considered, the consumption of the battery energy would become a big issue.

SUMMARY OF THE INVENTION

It is an object of the present invention to provide a radio telephone apparatus which is capable of releasing the holding of the radio telephone set out of respect for the intention of the user of the radio telephone set and to provide a method of controlling same.

It is another object of the present invention to provide a radio telephone apparatus which prevents useless power consumption and to provide a method of controlling same.

It is a further object of the present invention to provide a radio telephone apparatus in which, if the user of the radio telephone set performs a predetermined holding operation with an intention to reopen telephone communication via the radio telephone set, the hold state of the radio telephone set is not released by causing the subsidiary telephone set to go off-hook and to provide a method of controlling same.

It is a still further object of the present invention to provide a radio telephone apparatus which is capable of selectively setting one of a self-hold state in which the hold of the radio telephone set can be released only by the hold release operation at the radio telephone set, and a complete hold state in which the hold of the radio telephone set can be released by the hold releasing operation at any one of the radio telephone set and the subsidiary telephone set provided at the main station and to provide a method of controlling same.

It is a further object of the present invention to provide a radio telephone apparatus which disconnects the radio telephone line between the main station and the radio telephone set in a complete hold state to reserve power energy and to provide a method of controlling same.

It is a still further object of the present invention to provide a radio telephone apparatus which is switched automatically from the self-hold state to the automatic complete hold state after a lapse of a predetermined time of the self-hold state without being released in the self-hold state to reserve power energy and to provide a method of controlling same.

It is a further object of the present invention to provide a radio telephone apparatus which is capable of switching from the complete hold state to the self-hold state as occasion demands and to provide a method of controlling same.

In order to achieve the above objects, according to the present invention, arrangement is such that the function of releasing the hold state of the subsidiary telephone set by causing the subsidiary telephone set to go off-hook is controlled effectively or ineffectively by the operation of that telephone set on the side of the radio telephone set.

In the present invention, one of the self hold state which is released only by the hold releasing operation at the radio telephone set and the complete hold state which be released by the hold releasing operation at any one of the radio telephone set and the subsidiary telephone set is selectively set.

In the present invention, the radio link between radio telephone set and the main station in the complete hold state is disconnected.

Therefore, if the hold release operation is performed at the radio telephone set in the complete hold state, or if the operation is performed for returning from the complete hold state to the self-hold state, a radio link is established again between the main station and the radio telephone set.

As just described above, according to the present invention, arrangement is such that the function of releasing the hold state by the off-hook operation of the subsidiary telephone set provided at the main station is controlled effectively or ineffectively on the side of the radio telephone set, so that release of the held radio telephone set against the intention of the user of the radio telephone set is prevented and the caller on the side of the wire telephone line is prevented from being confused. If the battery power for the radio telephone set is consumed during telephone communication, the battery can be replaced with a new one in the complete hold state, the radio link is again connected to restart the telephone communication, and telephone communication can be reopened by the subsidiary telephone set, so that the present invention is very effective for coping with battery drainage which is the fate of battery driving.

DETAILED DESCRIPTION OF THE PREFERRED EMBODIMENT

Figure 1:
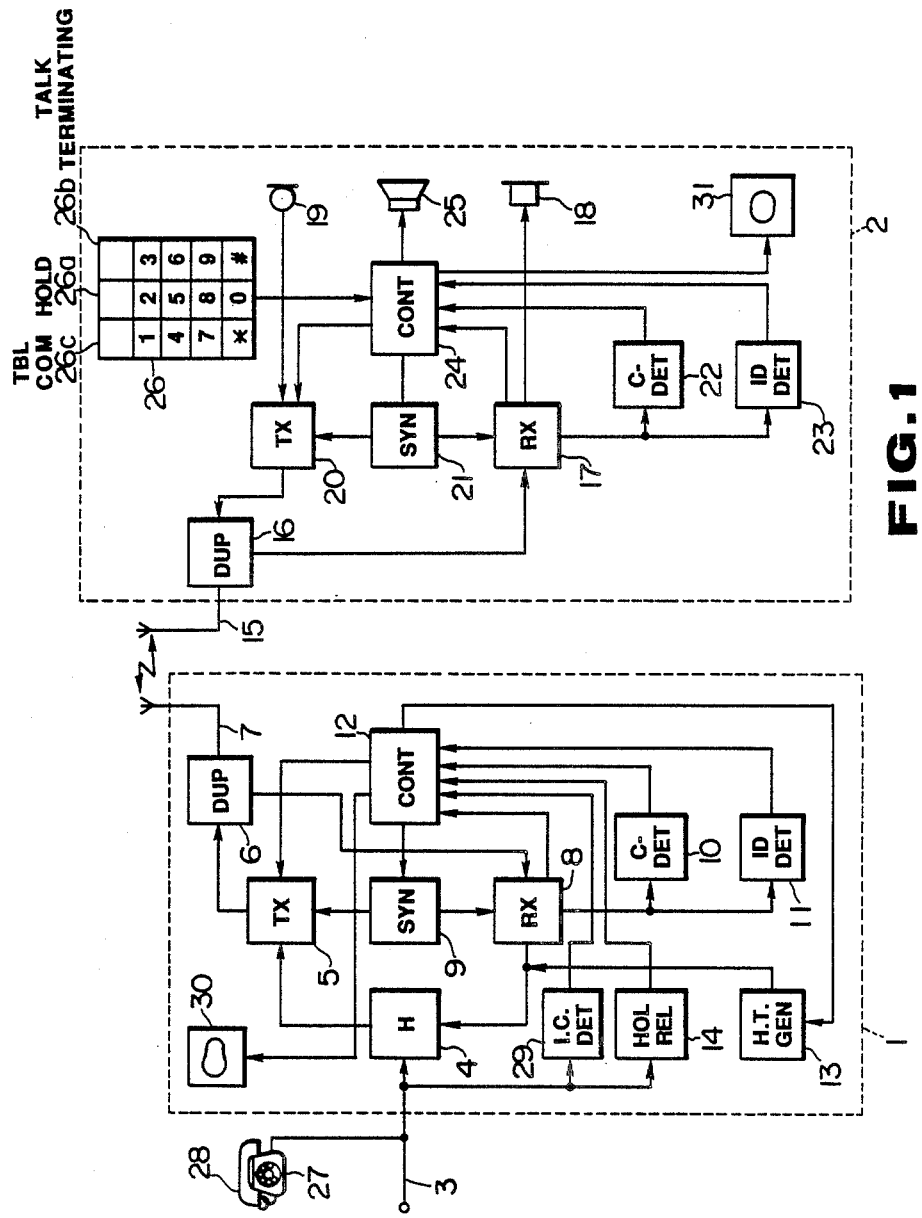
FIG. 1 is a block diagram of one embodiment of a radio telephone apparatus according to the present invention.

FIG. 1 is a block diagram of one embodiment of the radio telephone apparatus according to the present invention. In FIG. 1, a main station 1 is connected to a radio telephone set 2 via a radio link and also to a wire telephone line (subscriber line) 3.

The signal received from the wire telephone line 3 is delivered as a modulating input to a transmitter 5 via a hybrid circuit 4. The electric waves modulated by the transmitter 5 are transmitted from an antenna 7 via an antenna duplexer 6 to the radio telephone set 2.

The electric waves transmitted by the radio telephone set 2 are received by the antenna 7 and demodulated by a receiver 8 via the duplexer 6. The demodulated signal is transmitted via the hybrid circuit 4 to the wire telephone line 3.

A synthesizer 9 outputs a signal of a frequency corresponding to a radio channel (a telephone communication channel and a control channel) to the transmitter 5 and receiver 8.

One of the outputs from the receiver 8 is input to a received-field detector 10 to be used for determining the received field intensity. The detector 10 is generally referred to as a carrier squelch circuit or a noise squelch circuit. Another output from the receiver 8 is delivered as a data signal contained in the demodulated received wave to an identification signal detector 11 which checks an identification signal determined by the combination of the main station 1 and radio telephone set 2. The identification signal is generally referred to an ID code.

The outputs from the detectors 10 and 11 and the demodulated output of the data signal are input to a control circuit 12 to be used for connection control. The control circuit 12 controls the synthesizer 9 to control switching between radio channels, sends a transmission data signal as a modulating input to the transmitter 5, etc.

The holding tone generator 13 sends a holding tone to the wire telephone line 3 via the hybrid circuit 4. An automatic hold release circuit 14 detects the offhook operation of a subsidiary telephone 27 provided at the main station 1, inputs to the control circuit 12 a signal indicative of the detection of the off-hook operation of the telephone set 27 to thereby release the hold state of the telephone set.

An incoming call detector 29 detects an incoming call from the wire telephone line. The output from the detector 29 indicative of the detection of the incoming call is also input to the control circuit 12.

An indicator 30 indicates whether the main station is in a telephone communication or in a hold state. The indicator 30 is made, for example, of an LED and continuously lights when the main station is either in a telephone communication state or in a self-hold state, flashes when the main station is in a complete hold state and emits no light when the main station is in a standby state.

Similarly, the radio telephone set 2 also includes an antenna 15, an antenna duplexer 16 and a receiver 17, and the demodulated output from the receiver 17 is output to an ear piece 18. The voice entering a mouth piece 19 becomes a modulating input to a transmitter 20 and is transmitted from the antenna 15.

A synthesizer 21, a received-field detector 22, and an identification signal detector 23 are similar to those used in the main station 1, and a control circuit 24 provides control for the radio telephone set 2. A speaker 25 is a sounder which generates an audible ringing signal when an incoming call is received. A dial unit 26 performs calling and talk-terminating operations, inputs a dial number and performs a holding operation.

An indicator 31 indicates whether the radio telephone set is in a telephone communication state or in a hold state. The indicator 31 is made, for example, of an LED. It continuously emits light in the telephone communication state and flashes in the self-hold state or in the complete hold state.

The operation of the main station will now be described with reference to the flowchart of FIGS. 2-15. First, the operation performed until the main station enters a telephone communication will be described. The main station enters telephone communication when an incoming call is received from the wire telephone line 3 or when a call origination is made from the radio telephone set 2.

Figure 2:
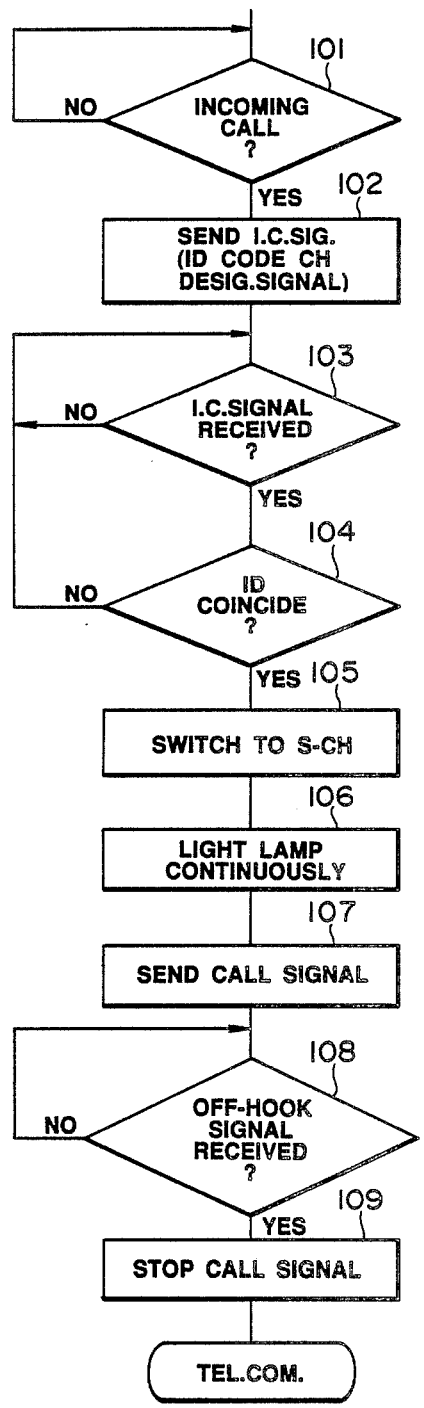
FIGS. 2 and 3 are flowcharts showing the operations of the main station and radio telephone set, respectively, performed when there is an incoming call from a wire telephone line.
Figure 3:
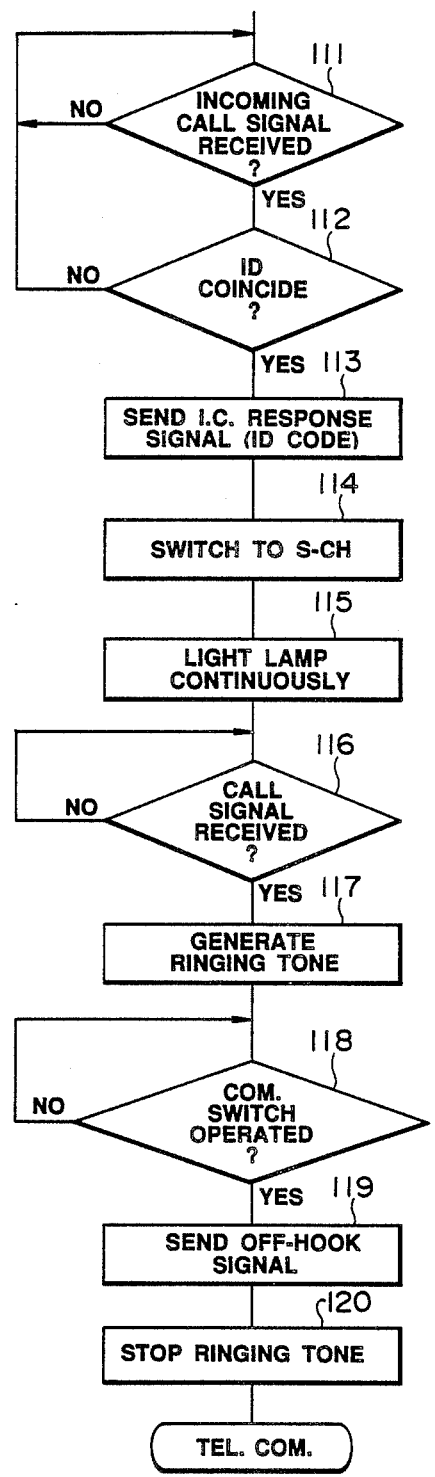

The operations of the main station 1 and the radio telephone set 2 performed when an incoming call is received from the wire telephone line 3 are illustrated in FIGS. 2 and 3, respectively.

If an incoming signal of 16 Hz arrives from the wire telephone line 3, this signal is detected by the incoming signal detector 29 of the main station 1, and the output from the detector 29 indicative of that detection is applied to the control circuit 12. Thus, the control circuit 12 determines that an incoming call is received (step 101), controls the transmitter 5 so as to send the incoming signal via the duplexer 6 and antenna 7 (step 102). The sending of this incoming call signal is performed via a control channel. The incoming signal contains an ID code and a channel designating signal to designate a talk channel.

The radio telephone set 2 receives the incoming signal at the receiver 17 via the antenna 15 and duplexer 16. The control circuit 24 detects the receipt of the incoming signal based on the output from the received-field detector 22 (step 111). Subsequently, the control circuit 24 checks whether the ID code contained in the incoming signal coincides with the ID code of the radio telephone set 2 (step 112). If so, the control circuit 24 controls the transmitter 20 to send an incoming call response signal via the duplexer 16 and antenna 15 (step 113). The incoming call response signal also contains the ID code. Thereafter, the control circuit 24 controls the synthesizer 21 to switch the radio channel of the transmitter 20 and receiver 17 to the talk channel designated by the channel designating signal contained in the incoming call signal (step 114). Thus the lamp of indicator 31 not lit so far is continuously lit (step 115).

When the control circuit 12 of the main station 1 detects the receipt of the incoming call response signal from the radio telephone set 2 in accordance with the output of the received-field detector 10 (step 103), it checks whether the ID code contained in the incoming call response signal coincides with the ID code of the main station 1 (step 104). If so, the control circuit 12 controls the synthesizer 9 so as to switch the radio channel of the transmitter 5 and receiver 8 to telephone communication channels designated by the channel designating signal received together with the incoming call signal (step 105). Thus, the control circuit continuously lights the lamp of the indicator 30 (step 106) and sends the call signal via the telephone communication channel (step 107).

When the radio telephone set 2 receives this call signal (step 116), it controls the sounder 25 to generate an audible ringing signal (step 107). If a talk key 26C of the dial unit 26 is pressed in response to the ringing signal (step 118), the radio telephone set 2 sends an off-hook signal to the main station 1 (step 119), and stops the generation of the ringing signal from the sounder 25 (step 120). When the main station 1 receives this off-hook signal (step 108), it stops the sending of the call signal (step 109). Thus, the main station 1 and radio telephone set 2 are put into telephone communication.

Figure 4:
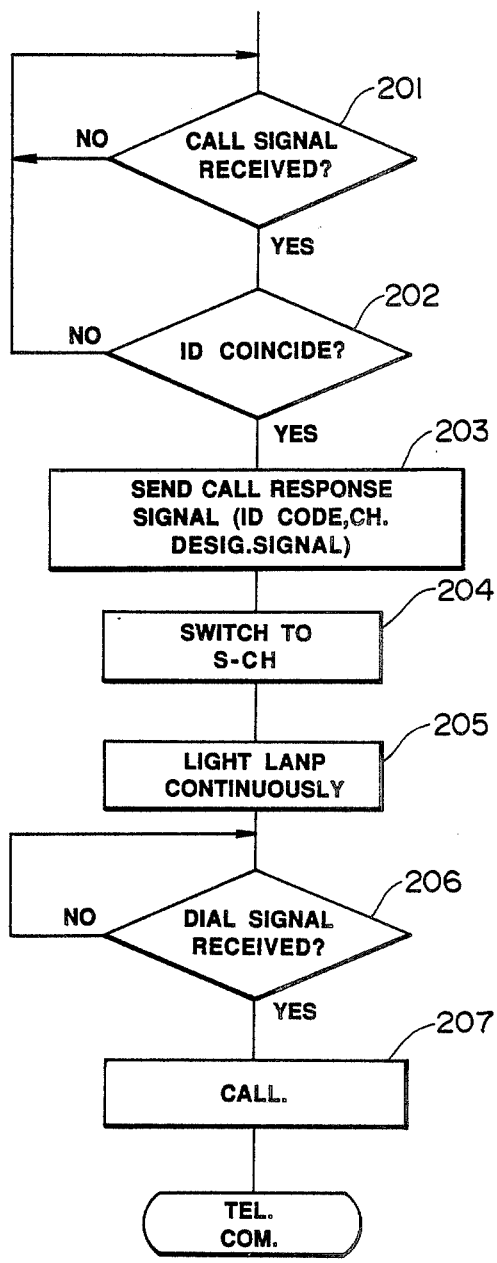
FIGS. 4 and 5 are flowcharts showing the operations of the main station and the radio telephone set, respectively, performed when the radio telephone set calls.
Figure 5:
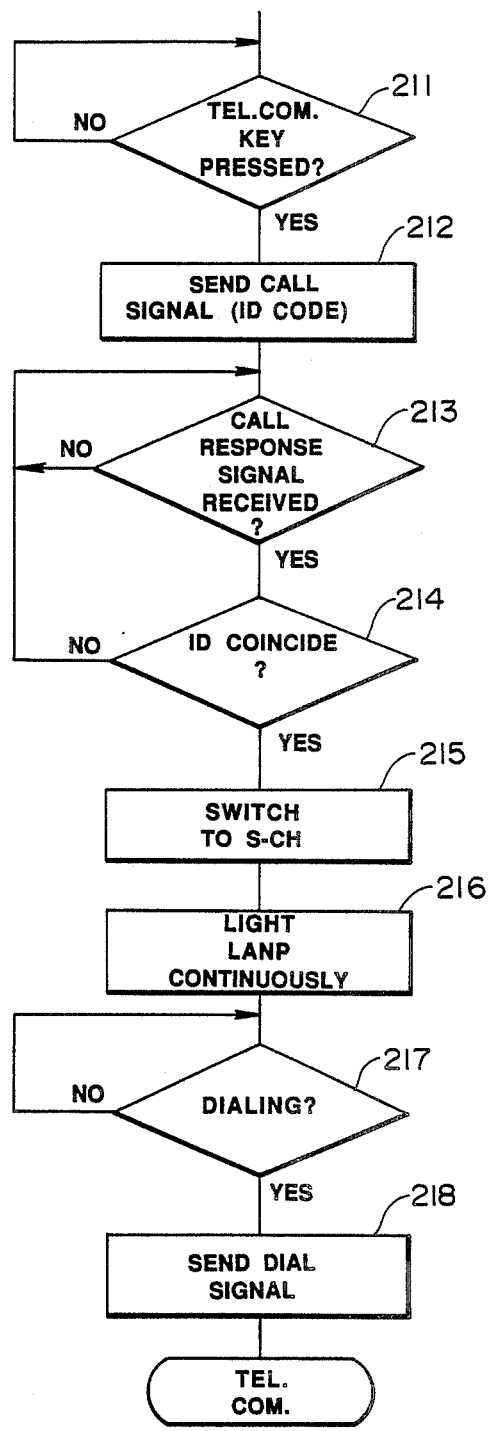

The operation of the main station 1 performed when a call origination signal is received from the radio telephone set 2 is illustrated in FIG. 4 and the operation of the radio telephone set 2 is illustrated in FIG. 5.

If the talk key 26C is pressed at the radio telephone set 2 (step 211), a call origination signal is sent from the radio telephone set 2 (step 212). The call origination signal contains the ID code.

When the main station 1 receives this call origination signal (step 201), it checks whether the ID code contained in the call origination signal coincides with the ID code of the main station 1 (step 202). If so, it sends a call response signal to the radio telephone set 2 (step 203). The call response signal contains the ID code and a channel designating signal to designate a telephone communication channel. Thereafter, the main station 1 switches the telephone communication channel to one designated by the channel designating signal (step 204), and continuously lights the lamp of indicator 30 (step 205).

If the radio telephone set 2 receives the call response signal from the main station 1 (step 213), and the ID code contained in the call response signal coincides with that of the radio telephone set 2 (step 214), it switches the telephone communication channel to the one designated by the channel designating signal contained in the call response signal (step 215) and continuously lights the lamp of the indicator 31 (step 216).

Subsequently, if the dialing operation is performed to a destination using the dial unit 26 of the radio telephone set 2 (step 217), the dial signal is sent to the main station 1 (step 218).

When the main station 1 receives this dial signal (step 206), it forms a telephone communication loop including the wire telephone line 3, sends the dial signal to the wire telephone line 3 to perform a predetermined calling operation to call the designation subscriber (step 207). When the destination subscriber responds, the main station 1 and radio telephone set 2 are put into telephone communication.

Figure 6:
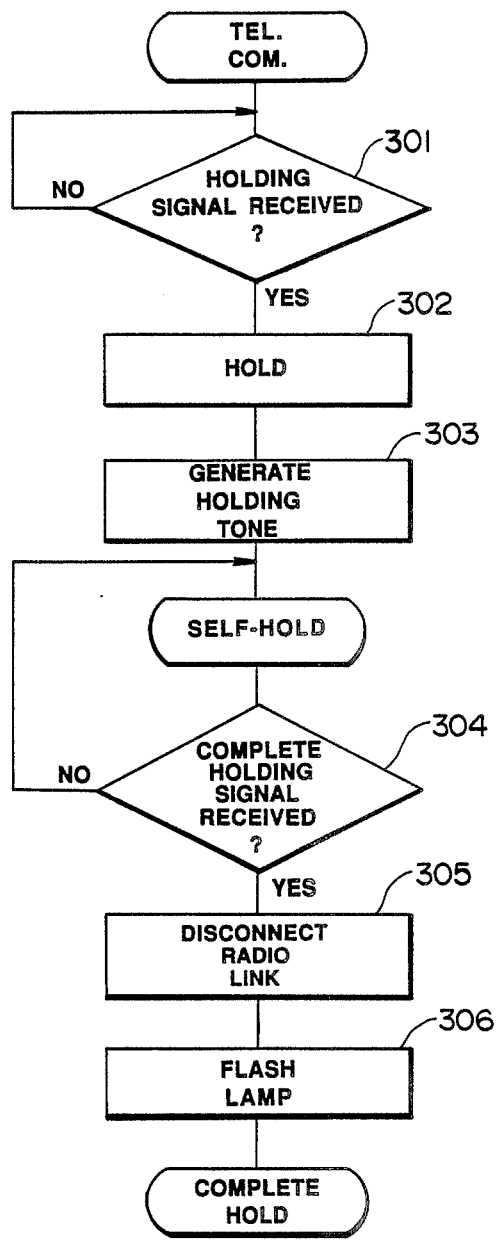
FIGS. 6 and 7 are flowcharts showing the operations of the main station and the radio telephone set, respectively, set in the self-hold state and in the complete hold state.
Figure 7:
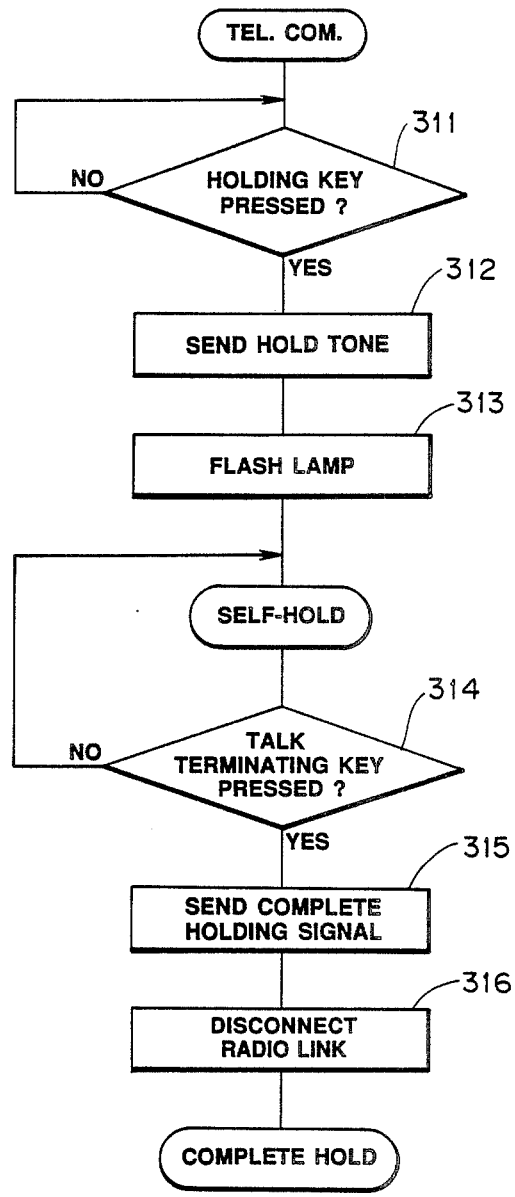

The control provided for temporarily holding the line in the telephone communication state will now be described. The operations of the main station 1 in this case is illustrated in FIG. 6 and the operation of the radio telephone set 2 is illustrated in FIG. 7.

If the user at the radio telephone set 2 presses a holding key 26a of the dial unit 26 to temporarily hold the line (step 311), a holding signal is sent from the radio telephone set 2 to the main station 1 (step 311). Sending the holding signal is performed using the telephone communication channel because the telephone set and the main station 1 are in the telephone communication state.

When the main station 1 receives the holding signal (step 301), it turns off the audio circuits of the transmitter 5 and receiver 8, and performs a predetermined holding operation to hold the line connected (step 302). Subsequently, it drives the holding tone generator 13 to generate a holding tone (step 303), and causes the holding tone to be sent to the destination subscriber via the hybrid circuit 4 and wire telephone line 3.

After sending the holding tone, the radio telephone set 2 flashes the lamp of the indicator 31 (step 313). In this case, the lamp of the indicator 30 of the main station 1 is lit continuously.

This state is the self-hold state. As will be obvious from a later description, the hold state can be released by repressing the holding key 26a of the radio telephone set 2 in the self-hold state, but it cannot be released by causing the telephone set 28 at the main station 1 to go off-hook. Therefore, if the user at the radio telephone set 2 wants to return to telephone communication using the radio telephone set 2, he is required to press only the holding key to set the telephone set at its self-hold state.

If the talk terminating key 26b in the dial unit of the radio telephone set 2 is pressed in the self-hold state, the complete hold state results. Namely, if the talk terminating key 26b is pressed in the self-hold state (step 314), a complete hold signal is sent from the radio telephone set 2 to the main station 1 (step 315). Thereafter, the radio telephone set 2 disconnects the radio link (telephone communication channel) between the radio telephone set 2 and the main station 1 (step 305).

If the main station 1 receives the complete hold signal from the radio telephone set 2, it disconnects the radio link (telephone communication channel) between the main station 1 and radio telephone set 2 (step 305), and switches the way of emitting light by the indicator 30 from continuous lighting to flashing (step 306). Thus, the complete hold state results in which, as will be obvious from a later description, the complete hold state can be released by either the repressing of the holding key 26a of the radio telephone set 2 or the off-hook operation of the subsidiary telephone set 28 provided at the main station 1.

Figure 8:
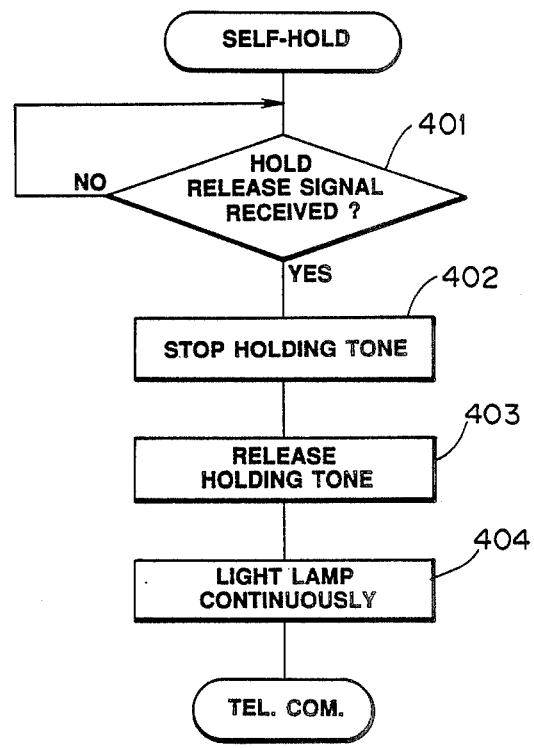
FIGS. 8 and 9 are flowcharts showing the operations of the main station and the radio telephone set, respectively, directed to the release of the selfhold state.
Figure 9:
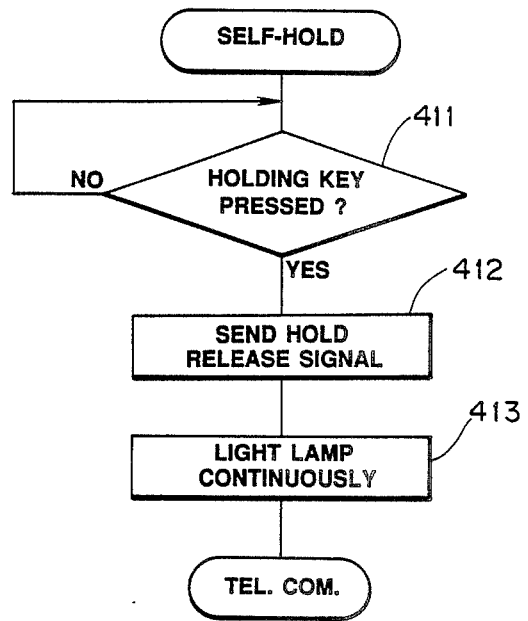

FIGS. 8 and 9 illustrate the release of the self-hold state of the main station 1 and radio telephone set 2, respectively.

In the self-hold state, the lamp of the display 30 of the main station 1 lights continously and the lamp of the indicator 31 of the radio telephone set 2 flashes. Under such conditions, if the holding key of the dial unit 26 of the radio telephone set 2 is pressed (step 411), a hold release signal is sent from the radio telephone set 2 to the main station 1 (step 412). Since the radio link between the main station 1 and radio telephone set 2 is maintained connected by the telephone communication channel, the hold release signal is sent via the telephone communication channel.

When the main station 1 receives the hold release signal (step 401), it controls the holding tone generator 13 to stop the generation of the holding tone (step 102), performs a predetermined hold release operation including turning on the audio circuits of the transmitter 5 and receiver 8 (step 403), and switches the way of emitting light by the indicator 30 from flashing to continuous lighting (step 404).

After sending the hold release signal, the radio telephone set 2 switches the way of emitting light by indicator 31 from flashing to continuous lighting (step 413). Thus, the self-hold state is released and the telephone communication state is recovered again.

Figure 10:
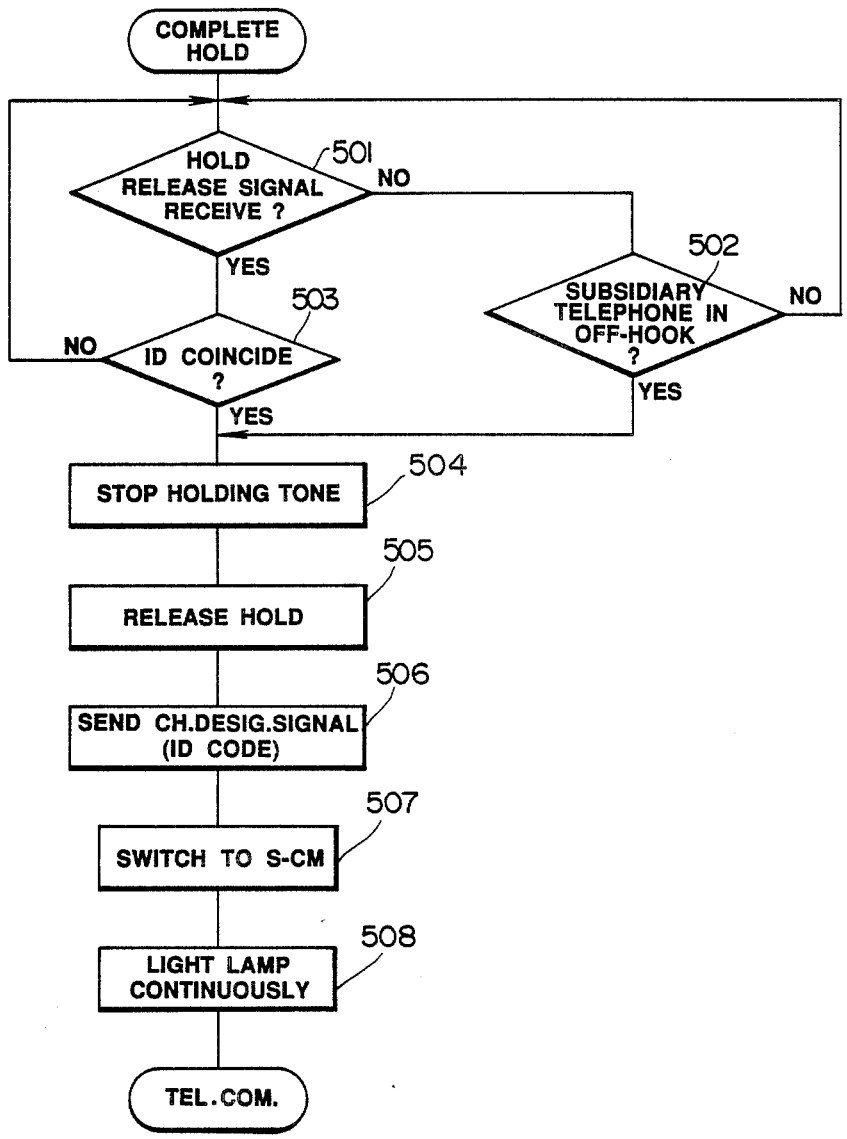
FIGS. 10 and 11 are flowcharts showing the operations of the main station and the radio telephone set, respectively, directed to the release of the complete hold state.
Figure 11:
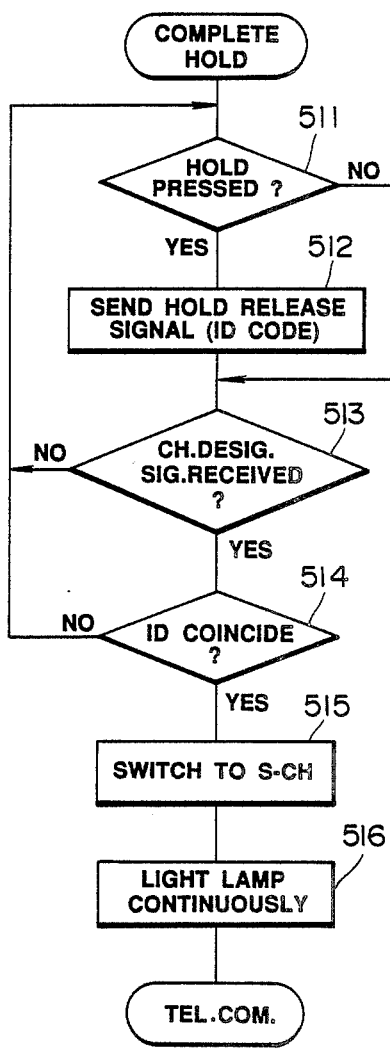

FIGS. 10 and 11 illustrate the hold release operations from the complete hold state for the main station 1 and radio telephone set 2, respectively.

In the complete hold state, the indicator 30 lamp of the main station 1 and the indicator 31 lamp of the radio telephone set 2 both flash. Under such conditions, if the hold key 26a of the radio telephone set 2 is pressed (step 511), a hold release signal is sent from the radio telephone set 2 to the main station 1. Since the radio link (telephone communication channel) between the main station 1 and the radio telephone set 2 is disconnected, sending the hold release signal is performed by the control channel. The hold release signal contains the ID code.

When the main station 1 receives the hold release signal (step 501) and finds that the ID code contained in the hold release signal coincides with that of the main station 1 (step 503), it controls the holding tone generator 13 to stop the generation of the holding tone (step 505), and sends a channel designating signal containing the ID code (step 506).

When the radio telephone set 2 receives the channel designating signal (step 513), it checks whether the ID code contained coincides with that of the radio telephone set 2 (step 514). If so, the radio telephone set switches the telephone communication channel to the one designated by the channel designating signal (step 515).

After sending the channel designating signal, the main station 1 switches the telephone communication channel to the one designated by the channel designating signal (step 507), and switches the way of emitting light by the display 30 from flashing to continuous lighting (step 508).

The way of emitting light by the indicator 30 of the radio telephone set 2 is also switched from flashing to continuous lighting after the channel is switched to the communication channel. Thus, a radio link (telephone communication channel) is established between the main station 1 and radio telephone set 2 to thereby enable telephone communication therebetween.

If the subsidiary telephone set 20 at the main station 1 is caused to go off-hook in the complete hold state, the hold release operation is performed as follows.

The off-hook operation of the telephone set 20 is detected by the automatic hold release circuit 14 using a change in the voltage or current in the wire telephone line 3.

When the off-hook operation of the telephone set 20 is detected in the complete hold state, the operation proceeds to step 502. The subsequent operations are similar to those performed when the holding key 26a of the radio telephone set 2 is pressed. Namely, the holding tone is stopped (step 504), the predetermined hold release operations are performed (505), the channel designating signal is sent (step 506), switching to the communication telephone channel is then performed (step 507) and the lamp of the display 30 is lit continuously (step 508).

When the radio telephone set 2 receives the channel designating signal (step 513) and detects the coincidence of the ID code (step 514), it switches the channel to the communication telephone channel (step 515), and lights the lamp of the indicator 30 continuously. Thus, the complete hold state is released and the telephone communication state results.

In this embodiment, when the subsidiary telephone set is caused to go off-hook in the complete hold state, a three-person telephone communication is made possible among the radio telephone set, the subsidiary telephone set and the telephone set connected to the wire telephone line. In this case, the three-person telephone communication can be formed where the connection is made between the subsidiary telephone set and the telephone set connected to the wire telephone line, and therefore it is unnecessary to set a telephone communication channel between the main station and the radio telephone set.

After the complete hold state is selected which enables to release the hold by the telephone set 28, return to the self-hold state may be wanted as occasion arises. In this case, the self-hold state may be recovered by pressing the talk key 26c of the dial unit in the radio telephone set 2.

Figure 12:
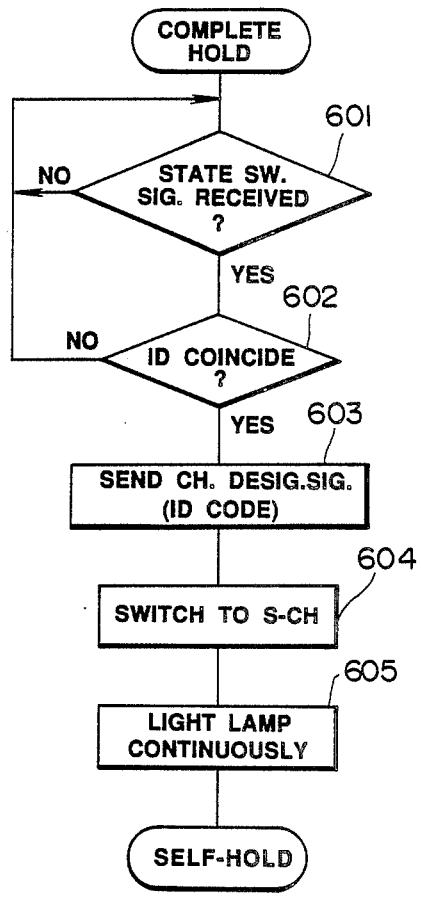
FIGS. 12 and 13 are flowcharts showing the operations of the main station and the radio telephone set, respectively, directed to switching from the complete hold state to self-hold state.
Figure 13:
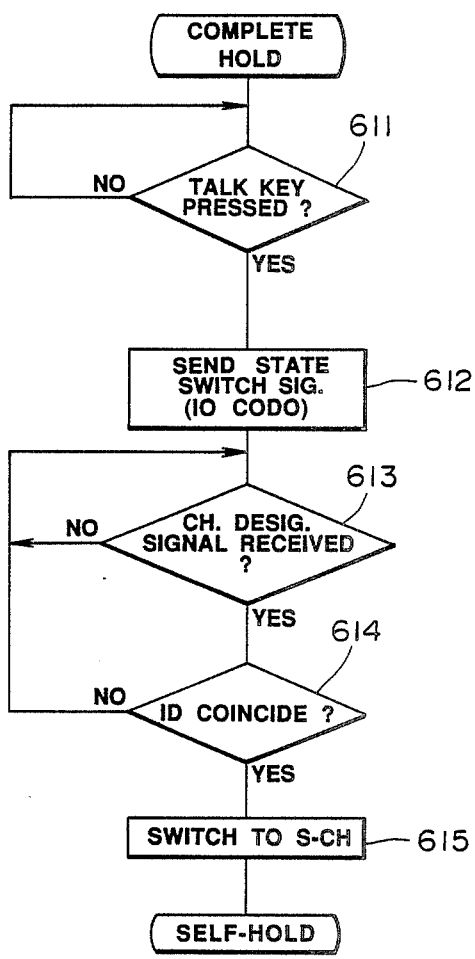

FIGS. 12 and 13 illustrate the operations of the main station 1 and radio telephone set 2, respectively, performed when switching is performed from the complete hold state to the self-hold state by pressing the talk key 26c.

If the talk key 26c of the radio telephone set 2 is pressed in the complete hold state (step 611), a state switching signal is sent from the radio telephone set 2 to the main station 1. Since the radio link (telephone communication channel) between the main station 1 and the radio telephone set 2 is disconnected, sending the state switching signal is performed via control channel. The state switching signal contains the ID code.

When the main station 1 receives the state switching signal (step 601) and finds that the ID code contained in the state switching signal coincides with that of the main station (step 602), it sends a channel designating signal containing the ID code (step 603).

When the radio telephone set 2 receives the channel designating signal (step 613), it checks whether the ID code contained coincides with that of the radio telephone set 2 (step 614). If so, the radio telephone set 2 switches the telephone communication channel to the one designated by the channel designating signal (step 615).

After sending the channel designating signal to the main station 1, the radio telephone set 2 switches the communication channel to the one designated by the channel designating signal (step 604), and switches the way of emitting light by the display 30 from flashing to continuous lighting (step 605). Thus the main station 1 and radio telephone unit 2 are maintained in the self-hold state.

In the particular embodiment, arrangement is such that a lapse of a predetermined time in the self-hold state without release switches automatically from the self-hold state to the complete hold state and that a lapse of a predetermined time of the complete hold state without release automatically brings about the standby state.

Figure 14:
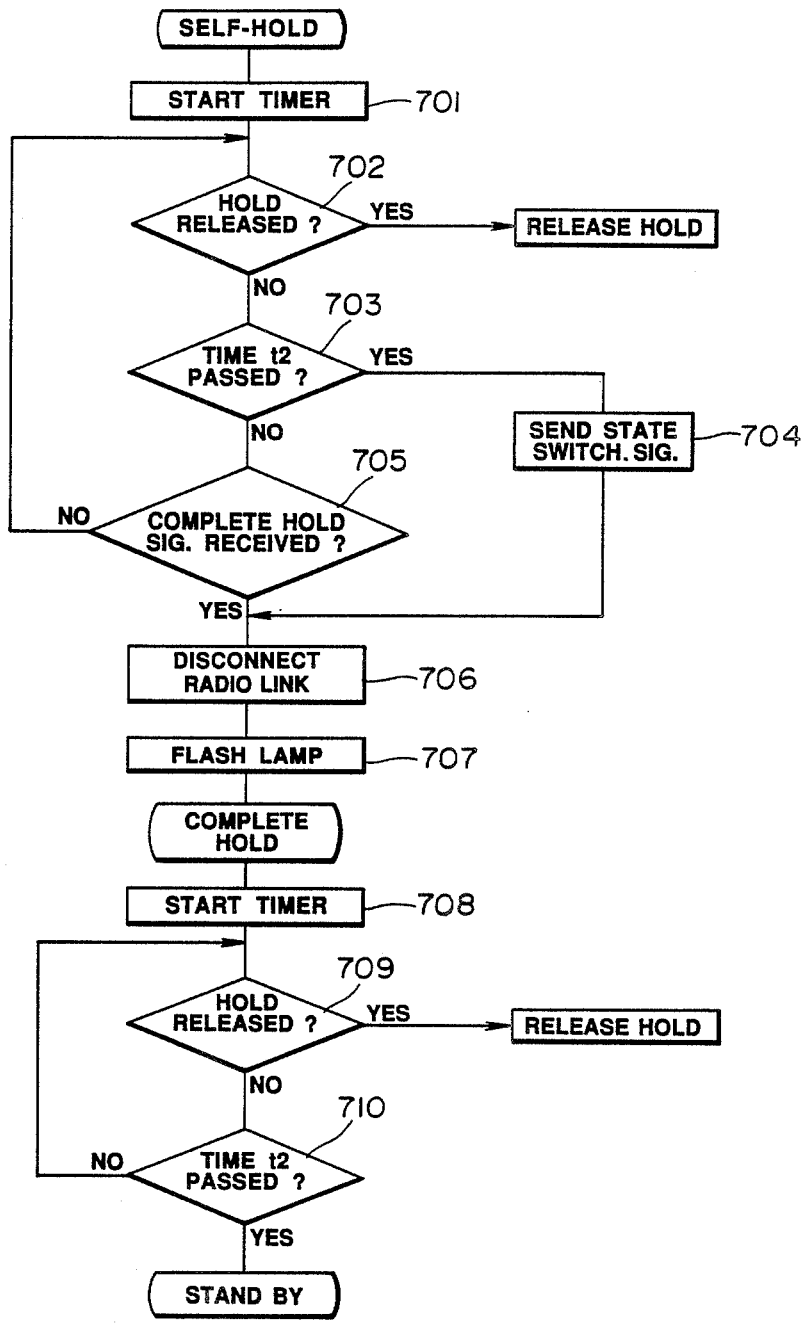
FIGS. 14 and 15 are flowcharts showing the operations of the main station and radio telephone set, respectively, directed to automatic switching from the self-hold state to the complete hold state and to the standby state.
Figure 15:
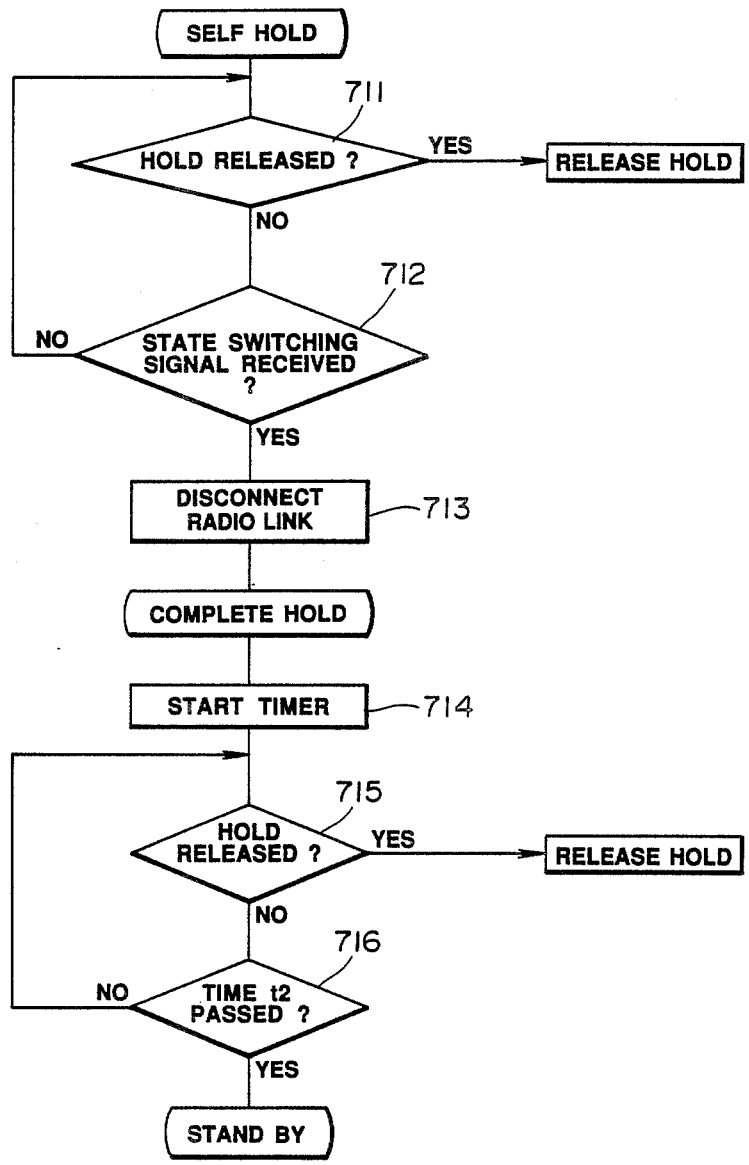

FIGS. 14 and 15 illustrate the respective operations of the main station 1 and radio telephone set 2, respectively, in automatic switching from the self-hold state to the complete hold state and from the complete hold state to the standby state.

When the self-hold state starts, the main station 1 starts the timer (step 701), and monitors whether the hold is released (step 702). If not, the main station checks whether a time $t_1$ has passed (step 703). If not, it checks whether the complete hold signal has been received for switching to the complete standby state (step 705), and control returns to step 702 if the main station has not received the complete hold signal. Thus, if a time $t_1$ has passed with no hold being released and with no complete hold signal being received, the main station 1 sends a state switching signal to the radio telephone set 2 via the telephone communication channel (step 704).

The radio telephone set 2 also monitors a release of the hold (step 711). When the radio telephone set monitors no release of the hold and receives a state switching signal from the main station 1 (step 712), it disconnects the radio link (telephone communication channel) between the main station 1 and the radio telephone set 2 (step 713).

After sending the state switching signal, the main station 1 also disconnects the radio link (telephone communication channel) between the radio telephone set 2 and the main station 1 (step 713), and switches the way of emitting light by the display 30 from continuous lighting to flashing (step 707).

Thus, the main station 1 and radio telephone set 2 are put into the complete hold state. If the main station 1 determines that there is a release of the hold at step 702, it moves to a predetermined hold releasing operation while if the telephone set 2 also determines that there is a release of the hold at step 11, it moves to a hold release operation. When the main station 1 receives the complete hold signal (step 705), it moves to the complete hold state irrespective of a lapse of time in the self-hold state.

If the complete hold state starts, the main station 1 starts the timer (step 708). If a time $t_2$ has passed (step 710) with no hold being released (step 209), the main station 1 disconnects the wire telephone line 3 and returns to its standby state.

When the complete hold state starts, the radio telephone set 2 also starts the timer (step 714). If a time $t_2$ has passed (step 716) with no hold being released (step 715), the radio telephone set returns to its standby state.

If it is determined that there is a release of the hold at steps 708 and 715, the corresponding predetermined releasing operations are performed.

While in the above-mentioned embodiment the telephone communication channel is kept to be set during the self-hold state, the telephone communication channel may be disconnected during the self-hold state. Further, during the complete hold state, the telephone communication channel may be kept to be set.

While, according to the above-mentioned embodiment, the subsidiary telephone set is separated from the main station, the subsidiary telephone set may be connected to the main station so as to be arranged integrally with each other.

While in the above-mentioned embodiment the speech path is established by the off-hook operation at the subsidiary telephone set, arrangement may be such that the speech path is established by depression of a button provided at the main station.

Further, arrangement may be such that a holding switch (button) is provided at the main station and that the complete hold state is attained by operating the holding switch (button).

What is claimed is:

1. A radio telephone apparatus comprising:
   a main station connected to a wire telephone line;
   a radio telephone set connected to the main station via a radio link; and
   a subsidiary telephone set provided at the main station;
   the radio telephone set including:
   self-hold setting means for setting telephone communication via the wire telephone line in a self-hold state;
   complete hold setting means for setting the telephone communication via the wire telephone line in a complete hold state; and
   the main station including:
   hold control means for holding telephone communication via the wire telephone line;
   hold release control means for enabling a release of the hold by the hold control means only by a hold release operation in the radio telephone set when the telephone communication is set in the self-hold state by the self-hold setting means, and by the hold release operation at the radio telephone set or at the subsidiary telephone set when the telephone communication is set in the complete hold state by the complete hold state setting means.

2. A radio telephone set according to claim 1, wherein the self-hold setting means includes a holding key and wherein the radio telephone set is set in a self-hold state in response to pressing the holding key alone.

3. A radio telephone apparatus according to claim 1, wherein the complete hold setting means includes a holding key and a talk terminating key pressed after the holding key is pressed.

4. A radio telephone apparatus according to claim 1, wherein the hold control means includes:
   means for holding the telephone communication via the wire telephone line in a connected state; and means for sending a holding tone to the wire telephone line when telephone communication via the wire telephone line is held by the holding means.

5. A radio telephone apparatus according to claim 1, wherein the main station includes means for indicating the complete hold state.

6. A radio telephone apparatus according to claim 5, wherein the indicating means includes a lamp which is lit during telephone communication and which flashes to indicate the complete hold state.

7. A radio telephone apparatus according to claim 1, wherein the radio telephone set further includes means for indicating the self-hold state and the complete hold state.

8. A radio telephone apparatus according to claim 7, wherein the indicating means includes a lamp lit during telephone communication and for indicating the self-hold state and the complete hold state by the flashing of the lamp.

9. A radio telephone apparatus according to claim 1, further including means for disconnecting the radio link connecting the main station and the radio telephone set in the complete hold state.

10. A radio telephone apparatus according to claim 1, further including means for switching the telephone communication from self-hold state to the complete hold state automatically after a lapse of a predetermined set time in the self-hold state without release.

11. A radio telephone apparatus according to claim 1, further including means for automatically disconnecting the wire telephone line to switch same to the standby state after a lapse of a predetermined time in the complete hold state without release.

12. A radio telephone apparatus according to claim 1, further including means for automatically switching the telephone communication from the self-hold state to the complete hold state after a lapse of a first set time in the self-hold state without release, and for automatically disconnecting the wire telephone line to switch the telephone communication from the complete hold state to the standby state after a lapse of a second set time in the complete hold state without release.

13. A radio telephone apparatus according to claim 1, wherein the hold release control means includes:
means for detecting the off-hook operation of the subsidiary telephone set; and wherein when the off-hook detecting means detects the off-hook operation of the subsidiary telephone set in the self-hold state, the hold release control means ignores the output from the off-hook detecting means indicative of the detection of the off-hook operation, and, when the off-hook detecting means detects the off-hook operation of the subsidiary telephone set in the complete hold state, the output from the off-hook detecting means releases the hold of the telephone communication.

14. A radio telephone apparatus comprising:
a main station connected to a wire telephone line;
a radio telephone set connected to the main station via a radio link; and
a subsidiary telephone set provided at the main station;
the radio telephone set including:
first key means for setting telephone communication via the wire telephone line in a self-hold state;
second key means for setting the telephone communication via the wire telephone line in a complete hold state; and the main station including:
means for detecting an off-hook operation of the subsidiary telephone set;
means for generating a holding tone;
hold control means for holding telephone communication via the wire telephone line in response to the operation of the first key in the radio telephone set and sending the holding tone generated by the holding tone generating means to the wire telephone line;
hold release control means for enabling a release of the held telephone communication in the self-hold state only by a hold release operation at the radio telephone set when the telephone communication is set in the self-hold state by the operation of the first key at the radio telephone set, and for enabling a release of the complete hold state by the release operation at the radio telephone set when the telephone communication is set in the complete hold state by the operation of the first key and the subsequent operation of the second key at the radio telephone set, and by the detection of the off-hook operation of the subsidiary telephone set by the off-hook detecting means; and
means for disconnecting the radio link connecting the main station and the radio telephone set in the complete hold state.

15. A radio telephone apparatus according to claim 14 where the first key means includes a holding key.

16. A radio telephone apparatus according to claim 14, wherein the second key means includes a talk terminating key.

17. A radio telephone apparatus according to claim 14, wherein the hold release operation at the radio telephone set is performed by reoperating the first key.

18. A radio telephone apparatus according to claim 14, wherein the main station includes means for indicating the complete hold state.

19. A radio telephone apparatus according to claim 18, wherein the indicating means includes a lamp which is lit during telephone communication and which flashes to indicate the complete hold state.

20. A radio telephone apparatus according to claim 14, wherein the radio telephone set further includes means for indicating the self-hold state and the complete hold state.

21. A radio telephone apparatus according to claim 20, wherein the indicating means includes a lamp lit during telephone communication and for indicating the self-hold state and the complete hold state by the flashing of the lamp.

22. A radio telephone apparatus according to claim 14, further including means for switching the telephone communication from self-hold state to the complete hold state automatically after a lapse of a predetermined set time in the self-hold state without release.

23. A radio telephone apparatus according to claim 14, further including means for automatically disconnecting the wire telephone line to switch same to the standby state after a lapse of a predetermined time in the complete hold state without release.

24. A radio telephone apparatus according to claim 14, further including means for automatically switching the telephone communication from the self-hold state to the complete hold state after a lapse of a first set time in the self-hold state without release, and for automatically disconnecting the wire telephone line to switch the telephone communication from the complete hold state to the standby state after a lapse of a second set time in the complete hold state without release.

25. A radio telephone apparatus according to claim 14, wherein the radio telephone set includes third key means, and means for switching the telephone communication to the self-hold state by operating the third key means in the complete hold state.

26. A radio telephone apparatus according to claim 25, wherein the third key means includes a talk key.

27. A radio telephone apparatus comprising a main station connected to a wire telephone line, and a radio telephone set connected to the main station via a radio link, a subsidiary telephone set provided at the main station and connected to the wire telephone line, the hold state of the wire telephone line set at the radio telephone set being released by a hold release operation at the radio telephone set or by an off-hook operation of the subsidiary telephone set, and means provided in the radio telephone set for effectively or ineffectively controlling a function of releasing the hold state of telephone communication by the off-hook operation of the telephone set.

28. A radio telephone system including fixed unit connected to a wire telephone line and having input means and speech input/output means; and
mobile unit capable of being connected to said fixed unit over at least an established radio link and having input means and speech input/output means, comprising a plurality of states of:
first speech communication state wherein a first speech communication link is established between a counterpart apparatus and said speech input/output means of said mobile unit via the wire telephone line and the radio link;
second speech communication state wherein a second communication link is established between a counterpart apparatus and said speech input/output means of said fixed unit via the wire telephone line;
self-hold state wherein the first speech communication link is disconnected from said speech input/output means and remains to be established at least between the counterpart apparatus and said fixed unit, the self-hold state being capable of transiting to the first speech communication state in response to only the input at said input means of said mobile unit; and
complete hold state wherein the first or second speech communication link is disconnected from said speech input/output means of said mobile unit or said fixed unit and remains to be established at least between the counterpart apparatus and said fixed unit, the complete hold state being capable of transiting to the first or second speech communication state in response to the input at said input means of said mobile unit or said fixed unit.

29. The system according to claim 28 wherein a transition from the self hold state to the complete hold state is automatically made in response to an elapse of a predetermined time period from a time when the self hold state is set.

30. The system according to claim 28 wherein a transition from the complete hold state to a standby state is automatically made in response to an elapse of a predetermined time period form a time when the complete hold state is set.

31. The system acoording to claim 28 further comprising indicating means disposed at said mobile unit for providing an indication to a user of the system in the self hold state or the complete hold state, the indication being different from that provided in the other states.

32. The system according to claim 28 further comprising indicating means disposed at said fixed unit for providing an indication to a user of the system in the complete hold state, the indication being different from that provided in the other state.

33. A method of controlling a radio telephone apparatus having a main station connected to a wire telephone line, a radio telephone set connected to the main station via a radio link, and a subsidiary telephone set provided at the main station, the method comprising the steps of:
setting telephone communication via the wire telephone line in a self-hold state;
setting the telephone communication via the wire telephone line in a complete hold state; and
enabling a release of the hold by the hold control means only by a hold release operation in the radio telephone set when the telephone communication is set in the self-hold state by the self-hold setting means, and by the hold release operation at the radio telephone set or at the subsidiary telephone set when the telephone communication is set in the complete hold state by the complete hold state setting means.

34. A method of controlling a radio telephone apparatus according to claim 33, further including a step of disconnecting the radio link connecting the main station and the radio telephone set in the complete hold state.

35. A method of controlling a radio telephone apparatus according to claim 33, further including a step of switching the telephone communication from self-hold state to the complete hold state automatically after a lapse of a predetermined set time in the self-hold state without release.

36. A method of controlling a radio telephone apparatus according to claim 33, further including a step of automatically disconnecting the wire telephone line to switch same to the standby state after a lapse of a predetermined time in the complete hold state without release.

37. A method of controlling a radio telephone apparatus according to claim 33, further including a step of automatically switching the telephone communication from the self-hold state to the complete hold state after a lapse of a first set time in the self-hold state without release, and for automatically disconnecting the wire telephone line to switch the telephone communication from the complete hold state to the standby state after a lapse of a second set time in the complete hold state without release.

38. A method of controlling a radio telephone apparatus having a main station connected to a wire telephone line, a radio telephone set connected to the main station via a radio link, and a subsidiary telephone set provided at the main station, the method comprising:
a first step of setting telephone communication via the wire telephone line in a self-hold state;
a second step of setting the telephone communication via the wire telephone line in a complete hold state;
a third step of detecting an off-hook operation of the subsidiary telephone set;
a fourth step of generating a holding tone;
a fifth step of holding telephone communication via the wire telephone line in response to the fact that the telephone communication via the wire telephone line is set in a self-hold state and of sending the holding tone generated by the holding tone generating means to the wire telephone line;

a sixth step of enabling a release of the held telephone communication in the self-hold state only by a hold release operation at the radio telephone set when the telephone communication is set in the self-hold state, and of enabling a release of the complete hold state by the release operation at the radio telephone set by the detection of the off-hook operation of the subsidiary telephone set at the third step when the telephone communication is set in the complete hold state; and a seventh step of disconnecting the radio link connecting the main station and the radio telephone set in the complete hold state.

* * * * *